US007688394B2

(12) United States Patent
Yasui et al.

(10) Patent No.: US 7,688,394 B2
(45) Date of Patent: Mar. 30, 2010

(54) ACTIVE MATRIX LIQUID CRYSTAL DISPLAY DEVICE HAVING A FLICKER ELIMINATING CIRCUIT

(75) Inventors: Masaru Yasui, Tokyo (JP); Masahide Inoue, Tokyo (JP); Keitaro Yamashita, Tokyo (JP)

(73) Assignee: TPO Hong Kong Holding Limited, Shatin (HK)

( * ) Notice: Subject to any disclaimer, the term of this patent is extended or adjusted under 35 U.S.C. 154(b) by 345 days.

(21) Appl. No.: 11/791,044

(22) PCT Filed: Dec. 26, 2005

(86) PCT No.: PCT/IB2005/054399

§ 371 (c)(1),
(2), (4) Date: May 16, 2007

(87) PCT Pub. No.: WO2006/070331

PCT Pub. Date: Jul. 6, 2006

(65) Prior Publication Data

US 2008/0165302 A1 Jul. 10, 2008

(30) Foreign Application Priority Data

Dec. 28, 2004 (JP) ............................ 2004-381570

(51) Int. Cl.
*G02F 1/1333* (2006.01)
*G09G 3/36* (2006.01)

(52) U.S. Cl. ............................ 349/48; 345/94; 349/141

(58) Field of Classification Search ................... 349/33, 349/48, 38, 43, 158, 141
See application file for complete search history.

(56) References Cited

U.S. PATENT DOCUMENTS

2005/0270433 A1* 12/2005 Ohue et al. ................... 349/38

(Continued)

FOREIGN PATENT DOCUMENTS

JP 2000-010072 1/2000

(Continued)

OTHER PUBLICATIONS

PCT International Search Report of Counterpart PCT Application No. PCT/IB2005/054399.

(Continued)

*Primary Examiner*—Akm E Ullah
(74) *Attorney, Agent, or Firm*—Liu & Liu

(57) ABSTRACT

It is an object to provide an active matrix liquid crystal display device capable of effectively eliminating flicker with a simple structure. An active matrix liquid crystal display device has a plurality of gate lines, a plurality of source busses extending orthogonal to the gate lines, a plurality of liquid crystal elements provided in intersections of the gate lines with the source busses and, as a whole, disposed in matrix form, the liquid crystal devices being connected between a pixel electrode and an opposite electrode connected to a first bus line in a floating condition, a plurality of control circuits provided in relation with the liquid crystal element, the control circuits having: first and second transistors, of which gates are connected to the gate lines respectively, arranged in series between the source busses and the pixel electrode, a third transistor provided between a midpoint node of the first and second transistors and a second bus line to serve as a switch, the second bus line being identical in potential to the first bus line and being electrically isolated from the first bus line, and a fourth transistor connected in parallel with the liquid crystal elements between the pixel electrode and the opposite electrode to detect drain voltage.

9 Claims, 13 Drawing Sheets

U.S. PATENT DOCUMENTS

| | | | | |
|---|---|---|---|---|
| 2007/0126953 | A1 * | 6/2007 | Lai et al. | 349/110 |
| 2007/0139344 | A1 * | 6/2007 | Zheng et al. | 345/98 |
| 2007/0146276 | A1 * | 6/2007 | Syu et al. | 345/92 |

FOREIGN PATENT DOCUMENTS

| | | | |
|---|---|---|---|
| JP | 2000010072 | * | 8/2000 |

OTHER PUBLICATIONS

International Preliminary Report on Patentability of Counterpart PCT Application No. PCT/IB2005/054399.

* cited by examiner

ACTIVE MATRIX LIQUID CRYSTAL DISPLAY DEVICE HAVING A FLICKER ELIMINATING CIRCUIT

TECHNICAL FIELD

The present invention relates to an active matrix liquid crystal display device, and particularly, to an improvement of reduced flicker noise and enhanced display quality.

BACKGROUND ART

Recently, active matrix liquid crystal devices have been commonly used. The devices have liquid crystal cells disposed in matrix with thin film transistors (TFTs) therein serving as control devices for the liquid crystal cells, and have the features of thin bodies, reduced power consumption, and the like.

Control circuits of this type of active matrix liquid crystal display devices are known in the art as having a structure as disclosed in Japanese Patent Laid-open Publication No. 2000-10072 (Patent Document 1 listed below).

Drawings of the Patent Document 1 show a circuit configuration for a single picture element (pixel), including gate bus lines driven by a gate driver and data bus lines driven by a data driver. The liquid crystal cell is connected between an opposite electrode supplied with a fixed potential and the pixel electrode, which connects to the data bus line through two serially connected n-channel TFTs of which gates are connected to the gate bus line. In parallel with the liquid crystal cell, an auxiliary capacity is provided between the pixel electrode and the opposite electrode. A p-channel TFT has its source connected to a node between two of the n-channel TFTs and its gate connected to the gate bus line, and it is also supplied with a fixed potential at the same level as that retained at the opposite electrode.

Configured in this manner, while a gate signal from the gate driver is applied through the gate bus line to the TFT, a potential at the node between two of the TFTs is also fixed by the fixed potential, and even if the TFT does not have excellent properties, this permits the off current to be reduced while turning off the TFTs, which, in turn, enhances display capability of the pixels so as to eventually upgrade the total image.

[Prior Patent Document 1]

Japanese Patent Laid-open Publication No. 2000-10072

DISCLOSURE OF INVENTION

Technical Problem

In this prior art liquid crystal drive circuit, however, there may be a defect that a noise called “flicker” appears in the image.

This problem relates to asymmetrical waveforms in a positive/negative frame for the level at the drain (AC imbalance) and a certain difference between the average level of the drain signal and the common level (DC imbalance).

Such situations will be described with reference to FIG. 11 and FIGS. (1) to (6) where the waveforms applied to the liquid crystal cell are depicted.

In FIG. 11, a source data signal is a data signal that represents picture data for a picture to be displayed, and the liquid crystal cell receives the data signal by virtue of a gate drive signal periodically applied in each frame. The gate drive signal assumes pulse waveform which rises up to a certain level and then drops. Such quick and sharp rises and drops in level affect the drain signal, which can be observed as a quick drop of the level of the pixel voltage. This is named “kickback level shift”.

The pixel voltage level drop due to the kickback level shift varies over time, influenced by leak inside the control circuit. Specifically, it tends to increase when the contents of the data are plus-oriented, but it tends to decrease when the contents are minus-oriented.

As a result of the level reduction caused by the kickback and the level variation due to the leak, there arises a difference between the DC average or the average pixel voltage level and the center of source level (common level) or the median level of the data signal. Consequently, the variation in the pixel voltage level due to the level shift appears in the image as recognized as the flicker noise.

FIG. 1 is a schematic diagram illustrating the pixel voltage level in various cases of the AC and DC balances.

FIG. 1(1) illustrates waveform symmetrical about the common level (AC balanced), which indicates that there is no difference between the average drain level and the common level (DC balanced). FIG. 1(2) illustrates the waveform symmetrical about the common level, which indicates that the average drain level of two-dot-line differs from the common level (DC imbalanced). These are ideal cases where no leak occurs, but as mentioned above, the leak occurs in any real operation, and the pixel voltage varies over time.

FIG. 1(3) illustrates symmetrical waveform despite the occurrence of the leak, which indicates that the AC balance and DC balance are attained while FIG. 1(4) illustrates symmetrical waveform despite the symmetrical leak, which indicates that the AC balance is attained but the DC imbalance is associated. Similarly, FIGS. 1(5) and 1(6) illustrate waveforms influenced by the asymmetrical leak. In general, as shown in FIG. 1(6), the AC imbalance and the asymmetrical leak are negligible if eventually the DC balance is attained, and a predictable conclusion that no flicker is observed is followed by a next stage of the process of adjusting the DC voltage at the common potential level. This is, however, a kind of trade-off, which cannot cope with temperature variation and other variations in time-varying properties by a wide margin.

The above-mentioned kickback, which is one of the causes of the DC imbalance, will now be explained in detail. The kickback is a phenomenon that after a gate signal turns on the switch connected to the data line (source bus) to transfer data to the liquid crystal cell, turning the switch off affects the floating capacity in the liquid crystal cell, and this further causes the pixel voltage level to drop. As a result of such a phenomenon, the drain voltage relative to the common source potential varies as a whole, and the DC average level at the pixel signal level is reduced.

The primary cause of the AC imbalance is a significant variation in the pixel voltage level which is due to the leak between the pixel electrode and the source bus when the TFT is turned off. The degree of imbalance due to the leak current can be represented in both positive and negative signs, and the adjustment may cause more trouble such as a deviation from the optimum value depending upon the contents of the displayed image and the temperature, and even worse, the quality of display may be degraded and the reliability may be lost due to the problem of seizing.

Flicker is caused for both the reasons as mentioned above.

To cope with the DC imbalance, typically the common DC level is manually adjusted in the prior art, but this is annoying and it is hard to adjust accurately as desired.

On the other hand, to overcome the leak current, it is necessary to shut off a possible route of the leak to lead it to the common route.

Both of the counter measures cannot be done simultaneously in conventional devices.

This is why inducing the leak current to the common route to eliminate the AC balance affects and varies the required common level to eliminate the DC balance.

For that reason, the prior art active matrix liquid crystal display devices fail to effectively eliminate flicker.

The present invention is made in view of these circumstances, and accordingly, it is an object of the present invention to provide an active matrix liquid crystal display device capable of effectively eliminating flicker with a simple structure.

Technical Solution

According to a first aspect of the present invention, there is provided an active matrix liquid crystal display device comprising a plurality of gate lines, a plurality of source busses extending orthogonal to the gate lines, a plurality of liquid crystal elements provided in intersections of the gate lines with the source busses and, as a whole, disposed in matrix form, the liquid crystal devices being connected between a pixel electrode and an opposite electrode connected to a first bus line in a floating condition, a plurality of control circuits provided in relation with the liquid crystal elements, the control circuits having:

first and second transistors, of which gates are connected to the gate lines respectively, arranged in series between the source busses and the pixel electrode, and a third transistor provided between a midpoint node of the first and second transistors and a second bus line to serve as a switch, the second bus line being identical in potential to the first bus line and being electrically isolated from the first bus line.

According to a second aspect of the present invention, there is provided an active matrix liquid crystal display device comprising a plurality of gate lines, a plurality of source busses extending orthogonal to the gate lines, a plurality of liquid crystal elements provided in intersections of the gate lines with the source busses and, as a whole, disposed in matrix form, the liquid crystal devices being connected between a pixel electrode and an opposite electrode connected to a first bus line in a floating condition, a plurality of control circuits provided in relation with the liquid crystal elements, the control circuits having:

first and second transistors, of which gates are connected to the gate lines respectively, arranged in series between the source busses and the pixel electrode, a third transistor provided between a midpoint node of the first and second transistors and a second bus line to serve as a switch, the second bus line being identical in potential to the first bus line and being electrically isolated from the first bus line, and a fourth transistor connected in parallel with the liquid crystal elements between the pixel electrode and the opposite electrode to detect drain voltage.

Advantageous Effects

As has been described, a pixel signal from a liquid crystal cell is induced to a first common line conducted to an opposite electrode in a fashion of floating connection while a generated leak current is induced to a second common line separate from the first common line to eliminate the cause of varying the common level, and thus, automatically the DC balance can be attained to inhibit flicker, without an annoying adjustment.

Also, the attainment of the DC balance can be quickened by providing a means for detecting a drain level.

BEST MODE FOR CARRYING OUT THE INVENTION

Figure 1:
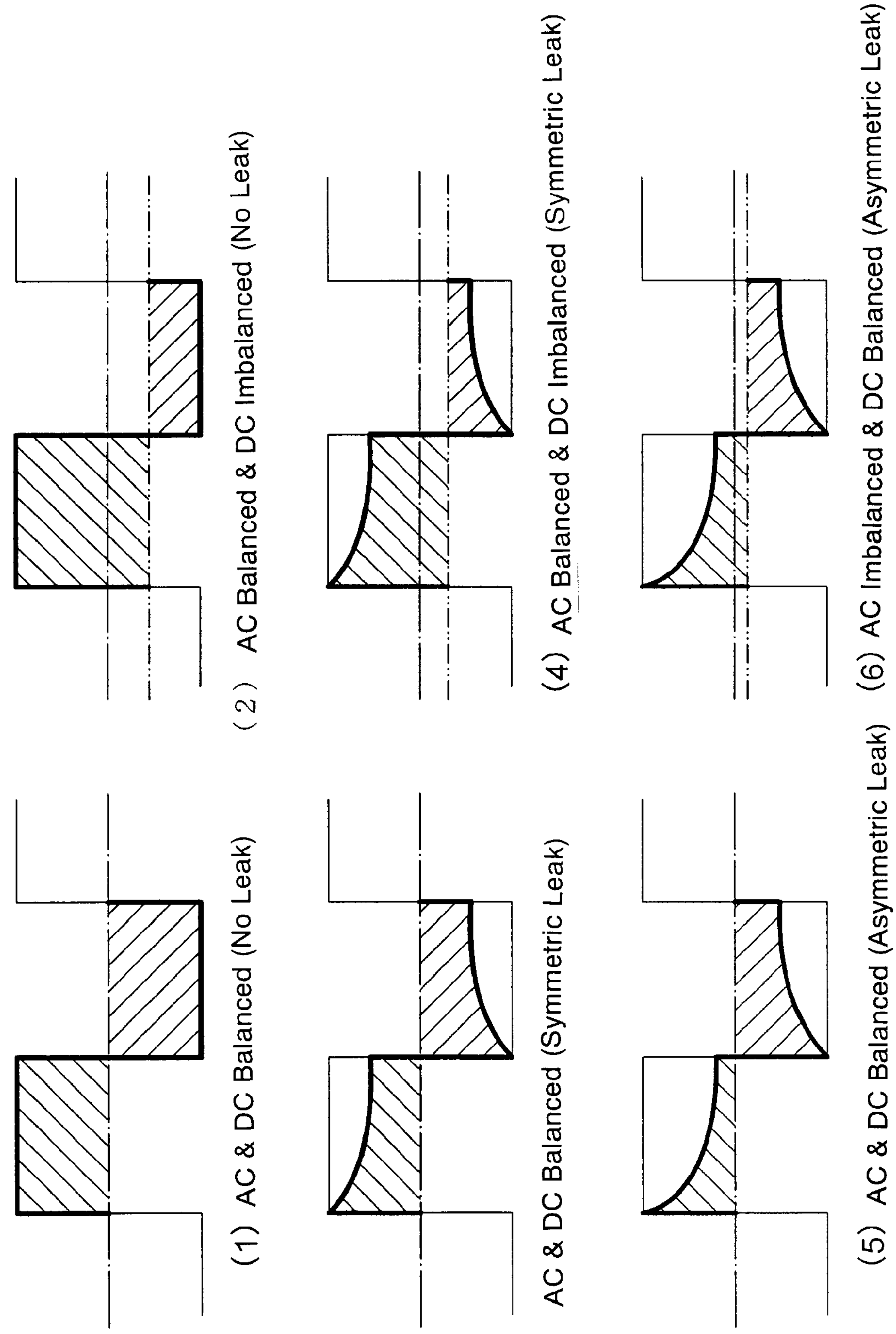
FIG. 1 illustrates waveforms of voltage applied to a liquid crystal cell, given to show disadvantages in the prior art.

Referring to the accompanying drawings, embodiments of the present invention will now be described. In the embodiments hereinafter, like reference numerals denote the same components, and the descriptions of them are omitted.

Figure 2:
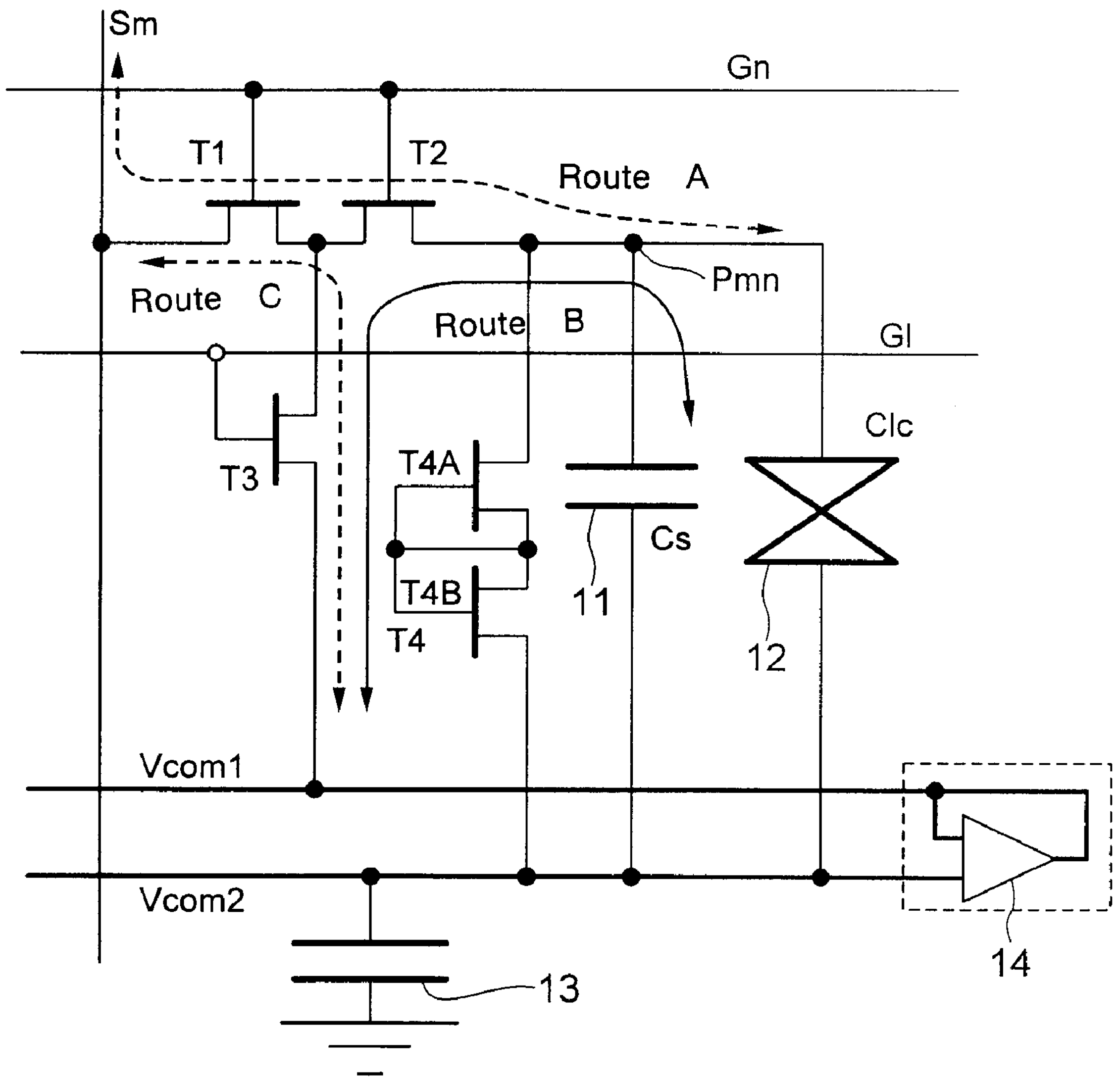
FIG. 2 is a circuit diagram showing one of display cells in a first embodiment of an active matrix liquid crystal display device according to the present invention.

FIG. 2 is a circuit diagram of a basic structure of the present invention, showing one of display cells of an active matrix liquid crystal display device. The actual liquid crystal display device has numerous display cells arranged in matrix.

A first and second thin film transistors (TFTs), T1 and T2, are connected in series between a source bus Sm serving as a data line and a pixel electrode Pmn, and the TFTs have their respective gates connected to a gate line Gn.

A third thin film transistor T3, which has its gate connected to a gate line G1, is connected between its drain connected to a first common line Vcom1 and a node or a midpoint between the TFTs, T1 and T2.

Between the pixel electrode Pmn and a second common line Vcom2, a liquid crystal cell 12 having a capacity Clc, a memory capacity 11 having a capacity Cs, and a transistor T4 are connected in parallel with one another. The transistor T4 actually consists of twin transistors T4A and T4B connected in series, and two of the transistors have their respective gates connected to a node of a midpoint of themselves. The transistor T4 has a large resistance value.

The second common line Vcom2 is in a floating mode as for direct current, DC, and it is grounded with a capacitance 13 of a large capacity interposed between them and is connected to one of inputs of a buffer amplifier 14. The other input of the buffer amplifier 14 is connected to the first common line Vcom1, and its output is connected to the first common line Vcom1 to supply voltage. The buffer amplifier 14 feeds its output potential back to its other input to keep the Vcom1 and Vcom2 at the same potential.

An operation of this circuit will now be described, and another circuit, which was contemplated in the course of completing the former circuit, is used in comparison. First, the operation of the circuit without the transistor T4 will be described with reference to FIG. 3. Although the capacity 13 and the buffer amplifier 14 connected to the common lines are omitted in FIG. 3, the common lines Vcom1 and Vcom2 are independent of each other but identical in potential, and the part may be considered as a short circuit for the convenience of understanding but must be noted in that the common line Vcom2 is in floating mode as in the above.

Now, two routes A and B are taken into consideration; where the route A leads from the source bus Sm through the transistors T1 and T2 to the liquid crystal cell 12 while the route B leads from the liquid crystal cell 12 through the transistors T2 and T3 to the first common line Vcom1.

Turning off the transistors T1 and T2 to turn off the liquid crystal cell, the route A, namely, an ordinary leak route, is shut off. The leak detouring from the route A varies a potential at the liquid crystal cell, and an amount of the variation depends upon the potential at the source bus. When the transistor T3 turns on, however, the leak current detouring from the route A is interrupted, and at this point, the leak current from the liquid crystal cell takes the route B to flow through the transistor T3 to the first common line. As a consequence, the second common line Vcom2 independent of the first common line and in a floating condition is electrically isolated from the leak current from the source bus which depends upon the contents of data. In this manner, the AC balance is retained.

Figure 11:
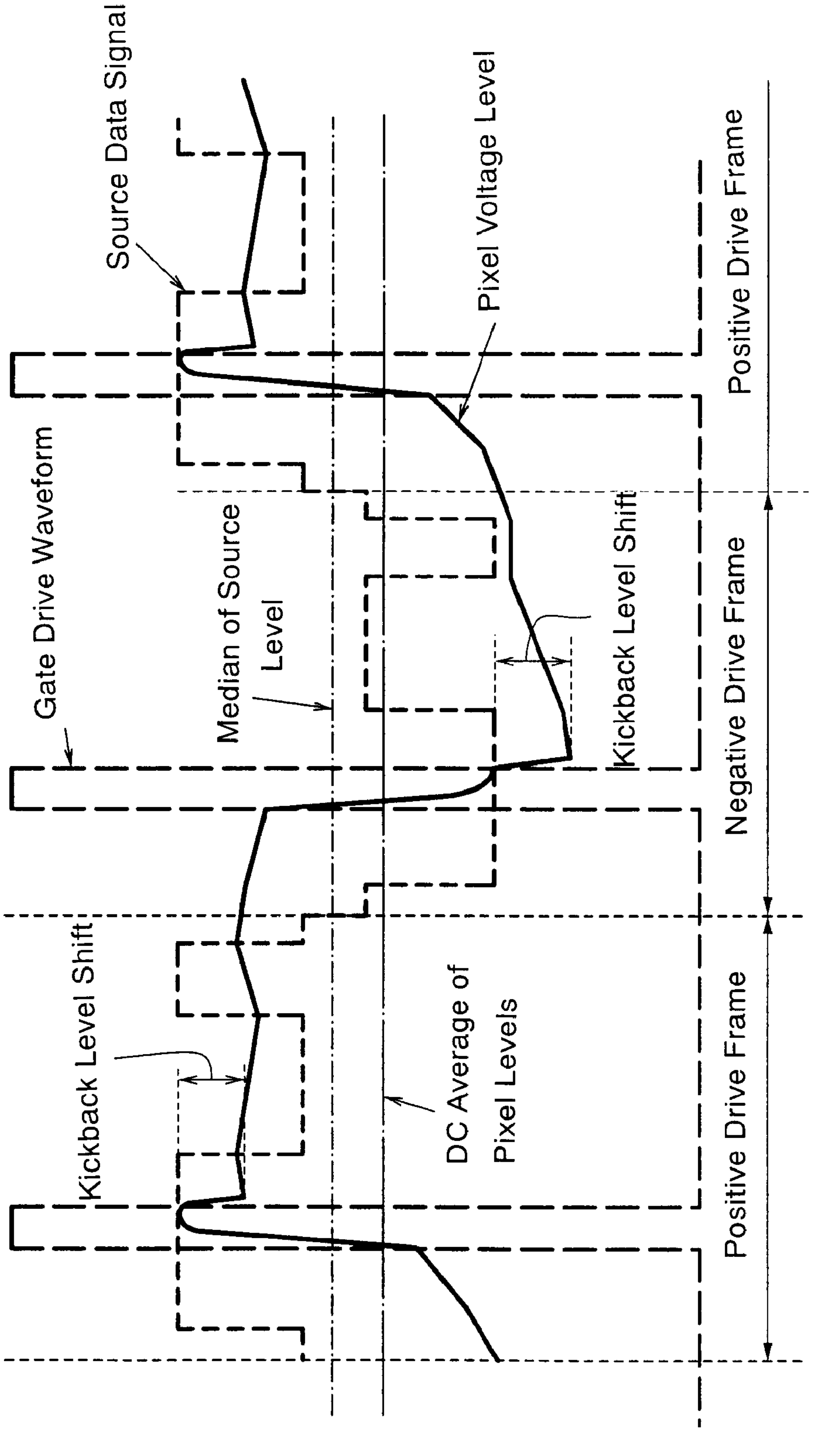
FIG. 11 illustrates waveforms of varied pixel voltage level on a device structure to which the present invention is not applied.
Figure 12:
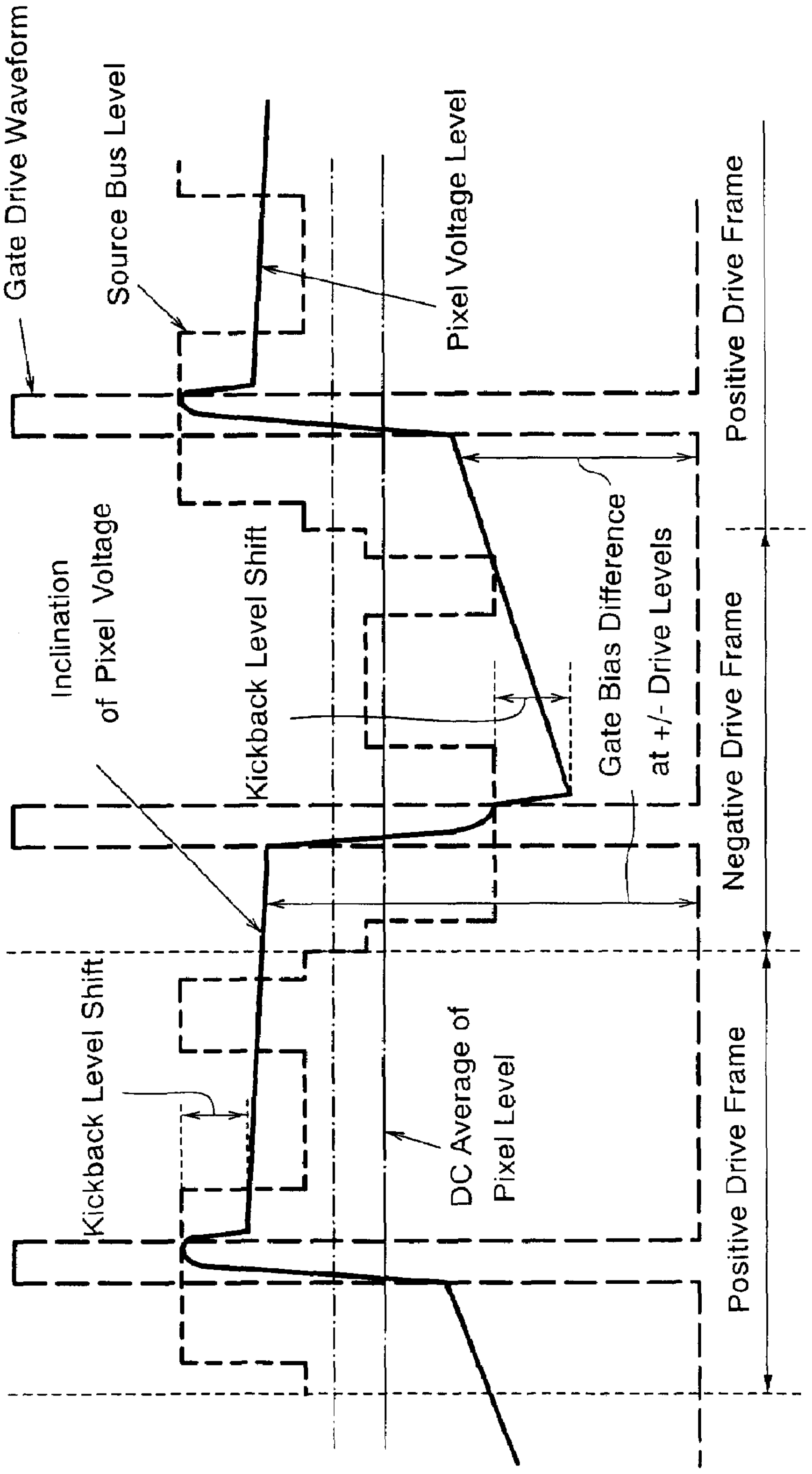
FIG. 12 illustrates waveforms of varied pixel voltage level on a device structure from which the causes of leak to source bus are eliminated.
Figure 13:
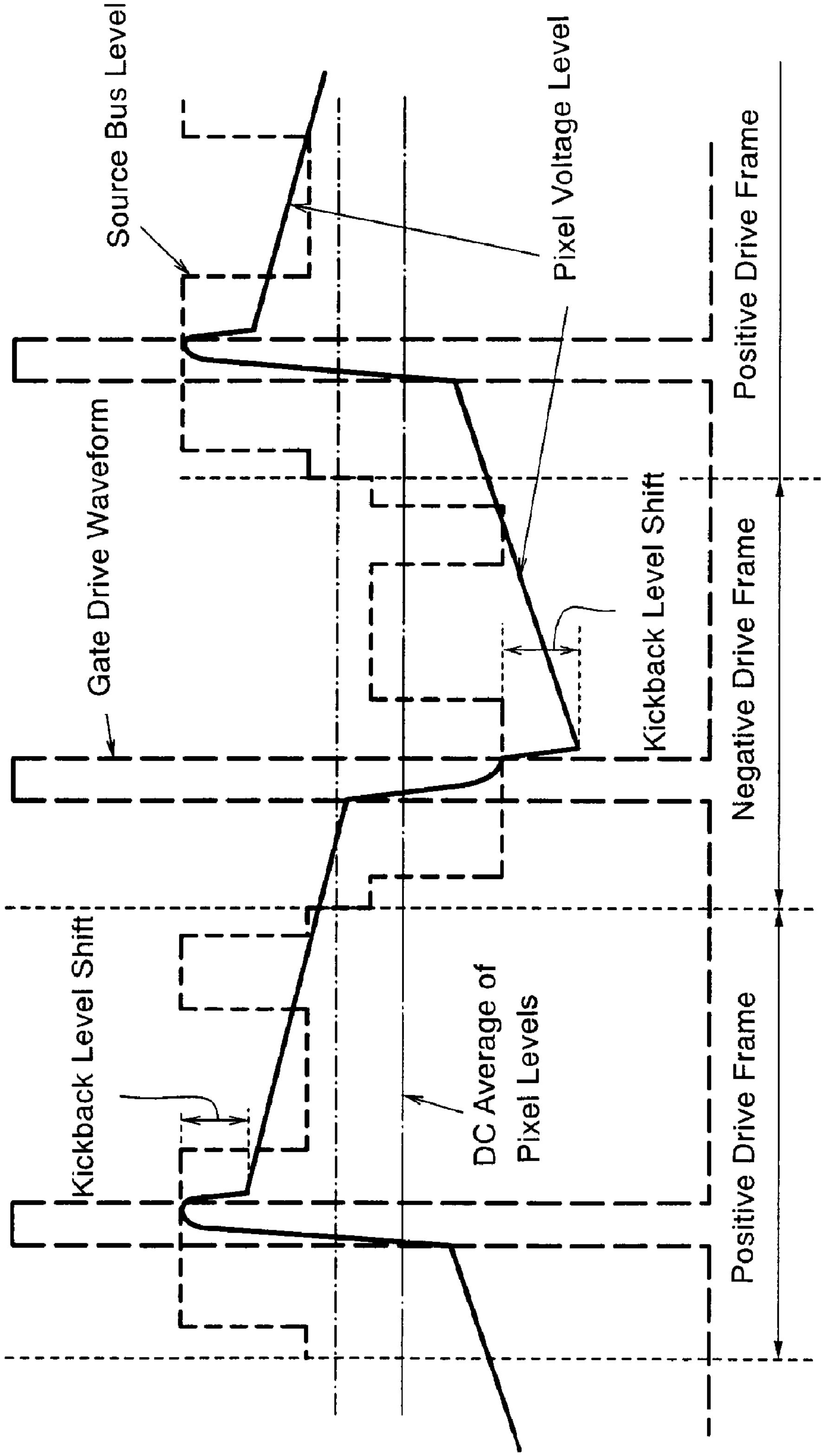
FIG. 13 illustrates waveforms of varied pixel voltage level on a device structure with a route useful in forcing leak current to flow in accordance with the present invention.

Such a situation is depicted in FIGS. 12 and 13, as well. FIG. 12 illustrates the situation where the transistors T1 and T2 are turned off while the transistor T3 is turned on, so as to shut off a route conducting to the source bus. Comparing FIG. 12 to FIG. 11, the source bus leak onto the pixel is no longer superposed on the data, neither do any increase and decrease in the pixel potential influenced by the data variations occur, and thus, it is observed, when the common lines Vcom1 and Vcom2 are set at the optimum DC common level, that the voltage level varies due to the leak evenly altering from the level at the liquid crystal cell to the DC common level.

In such a situation, however, as will be recognized if comparing the first positive drive frame with the succeeding negative drive frame, the decrease and increase in the level due to the leak are not symmetrical, and the AC balance is not cancelled. This is because the leak at the Transistor T2 on the new leak route B is not always constant, but rather different in amount between the currents from the pixel to the transistor T3 and vise versa. This is a leak current that depends upon relations between a gate bias potential at the transistor T3 and drain and source potentials at the transistor T2 while the latter (T2) is turned off, and the drain and source potentials at the transistor T2 are also varied depending upon the contents of displayed data and the polarity of outputs from the pixels inverting the supplied power into the alternating current.

In contrast, when the transistor T3 is turned on to force the leak current to flow toward the first common line Vcom1, as can be seen in the waveforms in FIG. 13, any leaking portion of the current is evacuated into the first common line Vcom1, and hence, the level reduction due to the leak is uniform throughout the frames, which results in the pixel voltage level waveform being symmetrical in each frame, thereby attaining the AC balance.

Because of the influences of the kickback, however, the DC average of the pixel level differs from the median value of the source level. Resolving the problem of flicker derived from such a difference is simply possible typically by an external adjustment of the common DC potential. Since the second common line is in a floating condition, both the values coincide with each other over a relatively long span, but the adjustment to a fixed potential as in the above may sooner or later result in the flicker being observed because of variations in the image and temperature, and other time-varying variations in properties.

Figure 4:
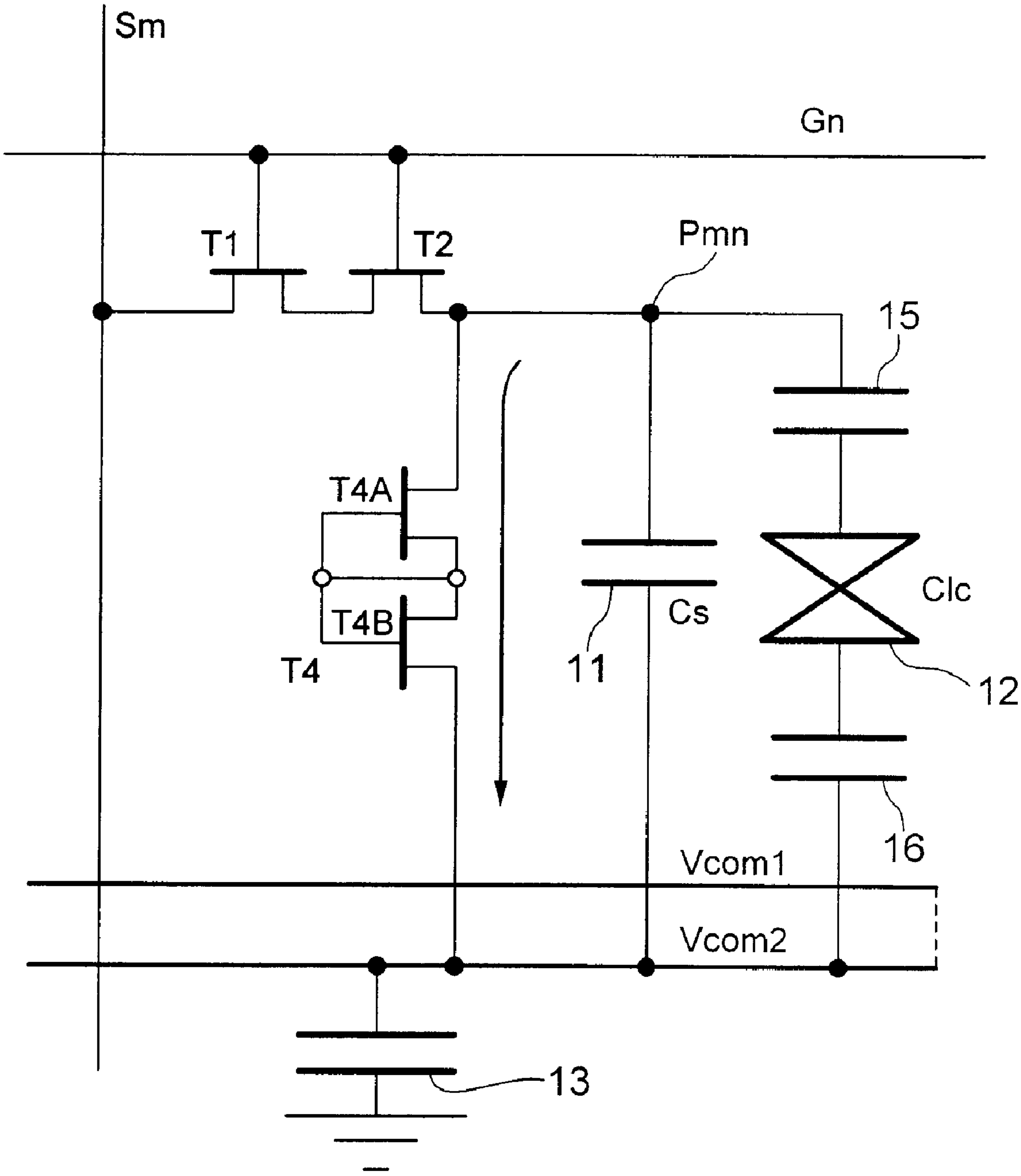
FIG. 4 is a circuit diagram showing another circuit contemplated in the course of completing the circuit in FIG. 2.

To overcome and eliminate the above defect, the transistor T4 is provided between the pixel electrode and the second common line Vcom2, as shown in FIG. 4. The common level at the second common line Vcom2 can be forcedly satisfied in an instance by the transistor T4 so as to coincide with the averaged drain level without external supply with the common voltage.

The capacitance of a great capacity is connected to the second common line Vcom2 because the second common lien is always to keep an AC low impedance condition.

Providing the circuit with the transistors T3 and T4 enables the AC imbalance and the DC imbalance to be considerably improved in a short time.

Additionally, there has been no reference so far to another leak route denoted by C in which the transistors T1 and T3 are included, as in FIG. 2. Since the aforementioned buffer amplifier 14 isolates the first common line from the second common line to keep the impedance of the second common line lower, the leak via the route C can be prevented.

Now, the further AC balance will be discussed. Turning on the transistor T3 blocks the leak of the data signal on the source bus, but while the transistor T2 is turned off, there still remains the leak route B from the pixel through the transistor T3. The leak observed on this route is as little as can be neglected, or otherwise, even if it cannot be neglected, the leak flowing out of the pixel is regarded as being equivalent to that flowing in the pixel. In practice, however, a relative relation between the source potential and the drain potential of the transistor T2 considerably varies because of the inversion of inputs into the alternating current, and thus, the values of the incoming and outgoing currents are not necessarily balanced, which may result in the potential at the pixels being unbalanced. A transistor T5 is provided to absorb a variation in OFF resistance of the transistor T2. The transistor T5 exhibits an unbalanced resistance having no polarity while the transistor T2 exhibits a resistance value so small as can neglect the OFF resistance but, on the other hand, sufficiently large relative to the pixel impedance.

In this way, since the leaking portion of the current is forcedly evacuated into the first common line to make the center of the waveform of the pixel voltage on the floating second common line for the liquid crystal cell identical to the DC average of the source bus level, not only the DC balance is attained but the AC imbalance is improved, and thus, the cause of the flicker is eliminated to enhance the quality of the image.

Figure 5:
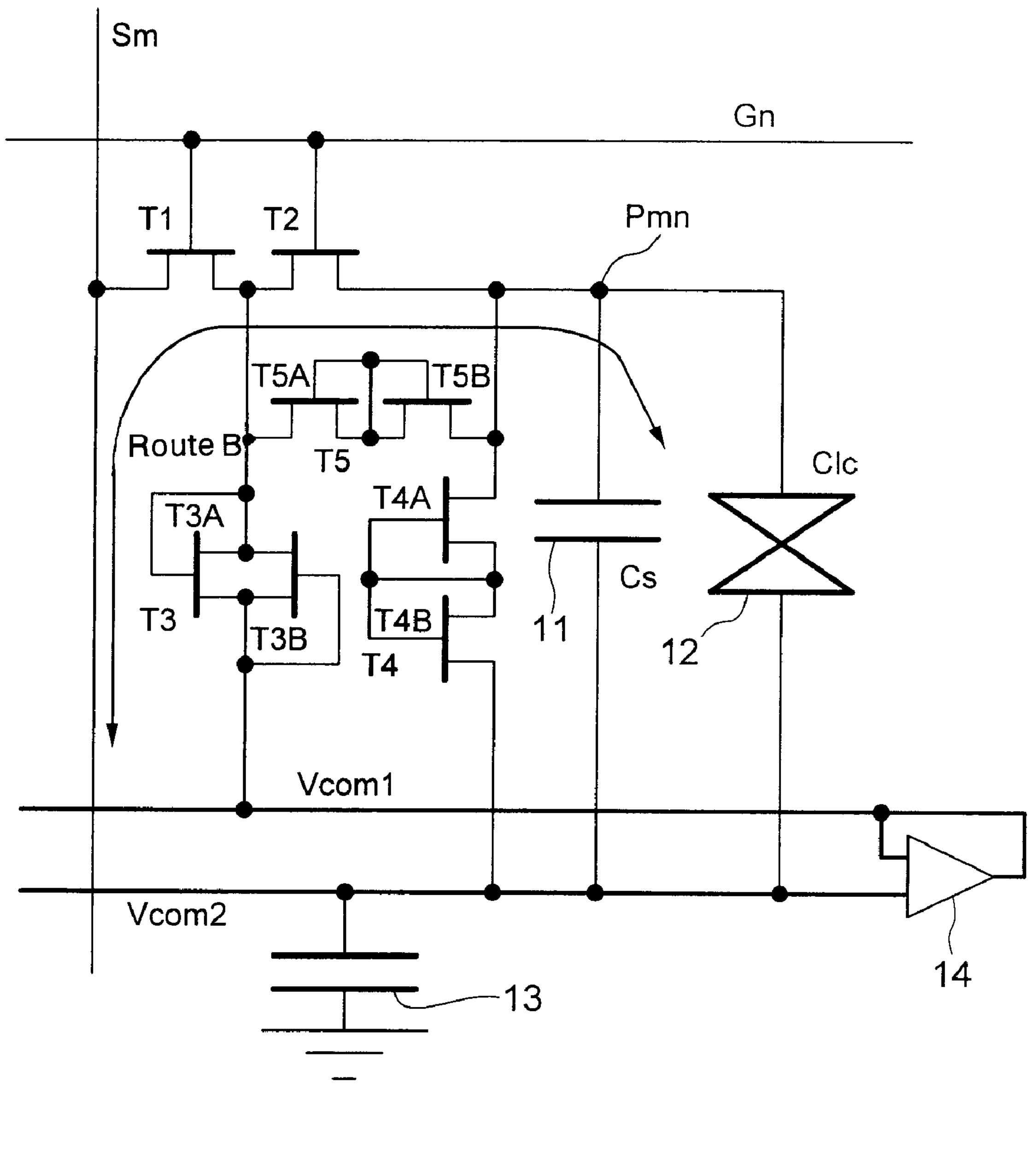
FIG. 5 is a circuit diagram showing one of display cells in a second embodiment of the active matrix liquid crystal display device according to the present invention.

FIG. 5 is a circuit diagram showing one of the display cells in another embodiment of the active matrix liquid crystal display device according to the present invention.

Comparing this embodiment with that shown in FIG. 2, the former is different from the latter in that the transistor T3 consists of two respectively self-biased thin film transistors T3A and T3B connected in parallel with each other and that, assuming a node between the transistors T1 and T2 is Node A, a node between the transistor T3A and Node A is Node B, and a node between the transistor T4A and the pixel electrode is Node C, the transistor T5 is connected between Node B and Node C.

The transistor T5 consists of twin thin film transistors, T5A and T5B, and both the transistors have their respective gates connected to a node or the midpoint between themselves.

Relations among the resistances of the transistors T1, T2, T3, T5 are set to the following formula:

T1on=T2on<<T3<<T5<<T2off where, for example, T1on=T2on is 1 M, T3 is 30 M, T5 is 1 G, and T2off is 30 G.

Implementing such relations in the device permits the leak at the transistor T2 to its right and left to be well balanced.

The thin film transistor T3 is designed to have a self-biasing configuration, and therefore, the line G1 is no longer needed, which simplifies the structure of the control circuit.

Configured as explained above, the leak property in the positive drive frame can be symmetrical to that in the negative drive frame.

Figure 6:
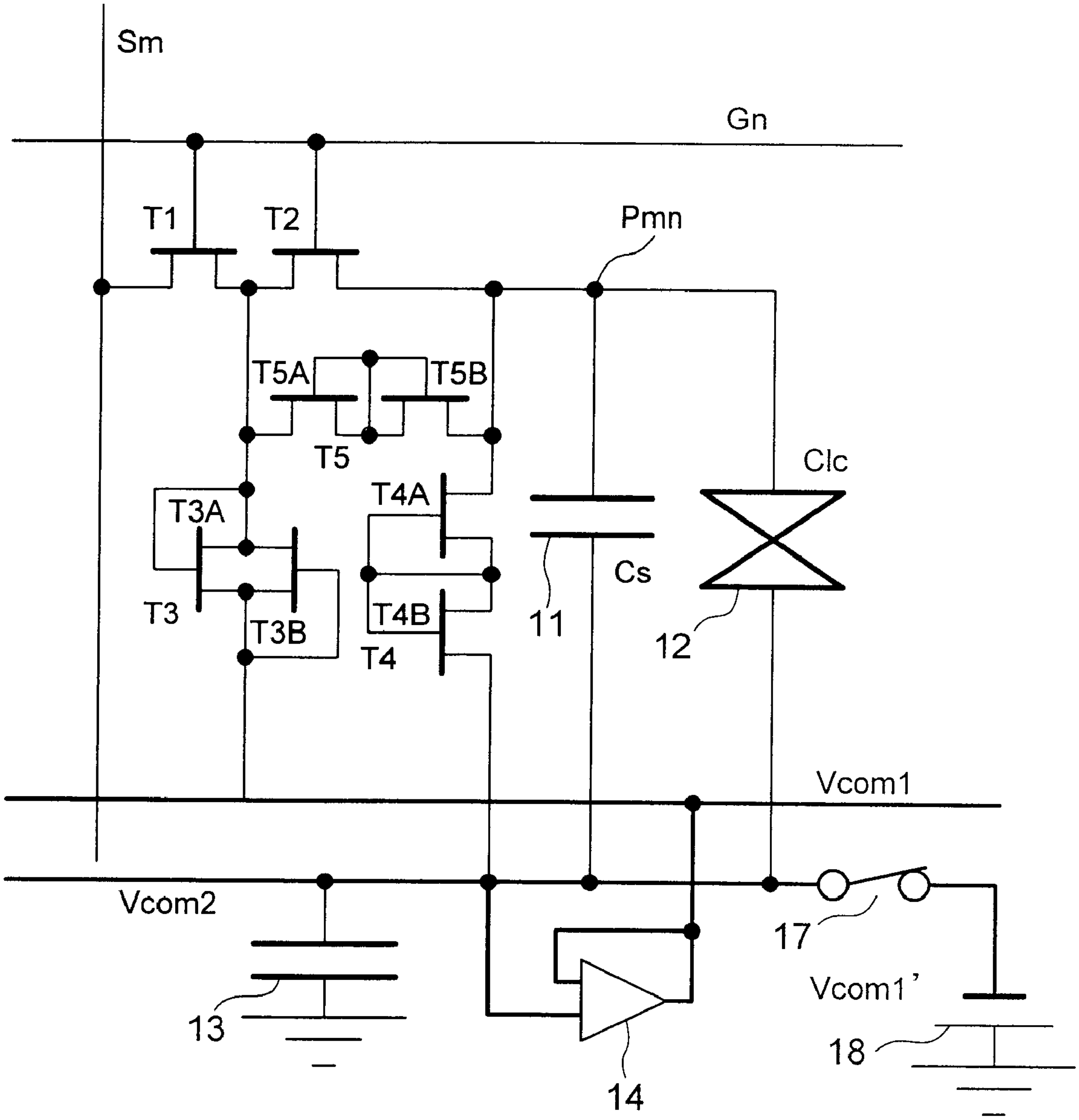
FIG. 6 is a circuit diagram showing one of display cells in a third embodiment of the active matrix liquid crystal display device according to the present invention.

FIG. 6 is a circuit diagram showing one of the display cells of a third embodiment of the active matrix liquid crystal device according to the present invention.

This embodiment is equivalent to the structure as in FIG. 5 to which a switch 17 and a pre-charging common line Vcom1' connected to a DC power supply 18 are added where the switch 17 is used to force the second common line to be supplied with voltage to initialize the circuit upon energizing the same.

Such a structure is employed because it takes a considerable time for the second common line in a floating condition to be supplied with voltage, especially, it takes a time to obtain an image without flicker upon energizing the device, and hence, the switch 17 is used to forcedly connect the DC power supply 18 to the second common line upon energizing the circuit, so as to raise its potential quickly. During such quick energizing, noise may be often caused, but some counter measures such as turning off the backlight may be effective to make the noise inconspicuous.

Figure 3:
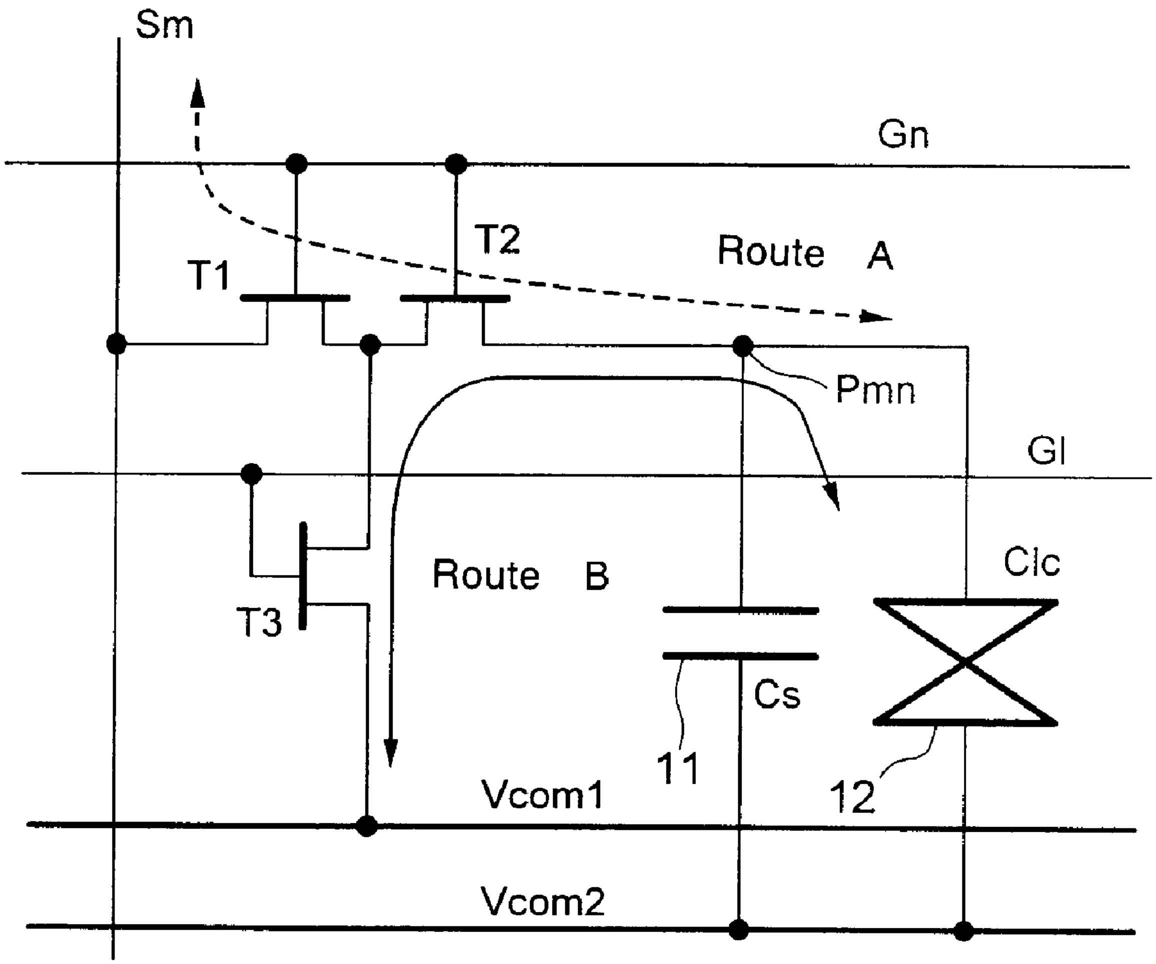
FIG. 3 is a circuit diagram contemplated in the course of completing the circuit in FIG. 2.
Figure 10:
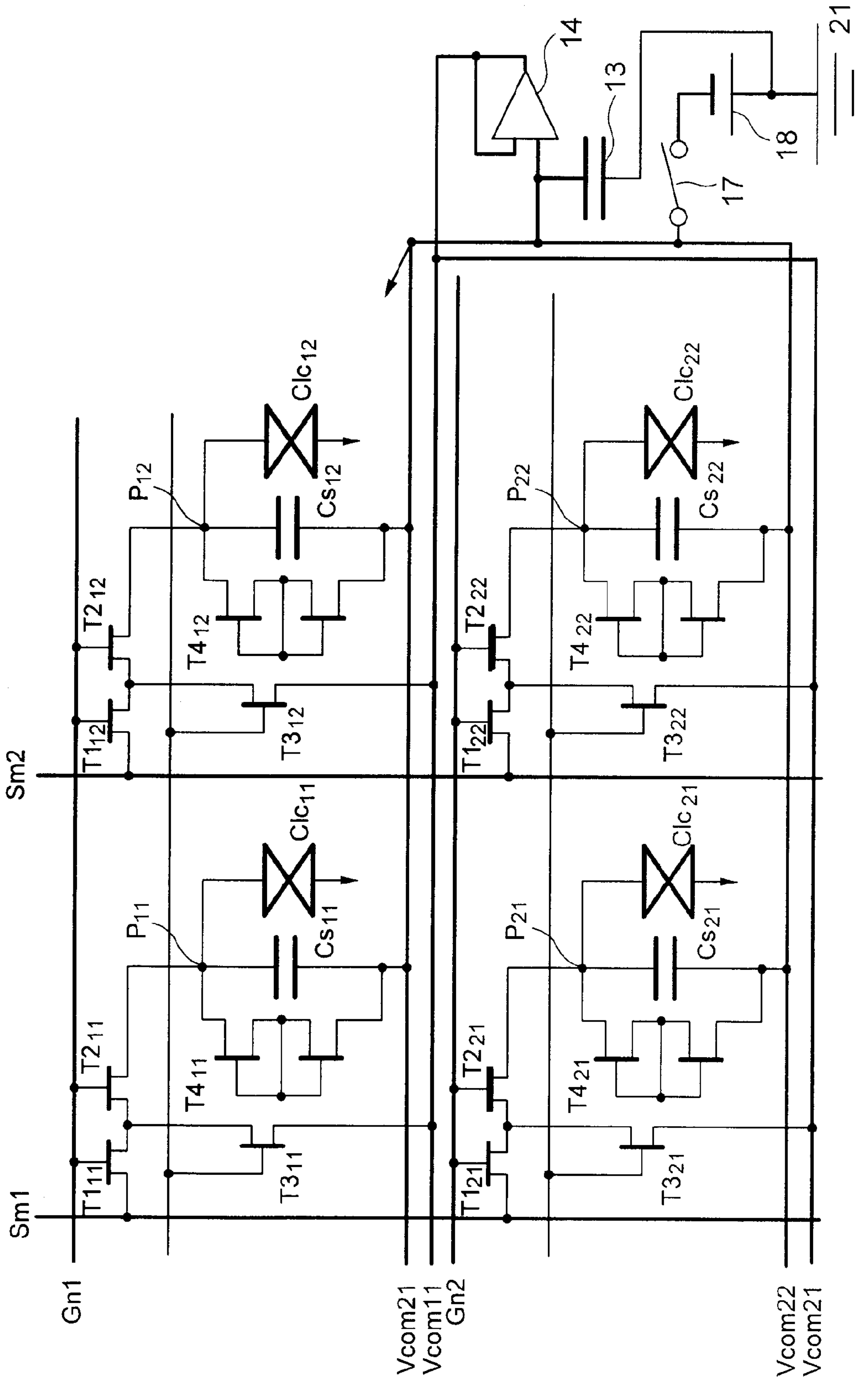
FIG. 10 is a circuit diagram showing four of the display cells in FIG. 2 arranged in matrix form.

FIG. 10 is a revised embodiment in 2×2 matrix where the initializing structure as described in FIG. 3 is applied in the embodiment in FIG. 2.

Figure 7:
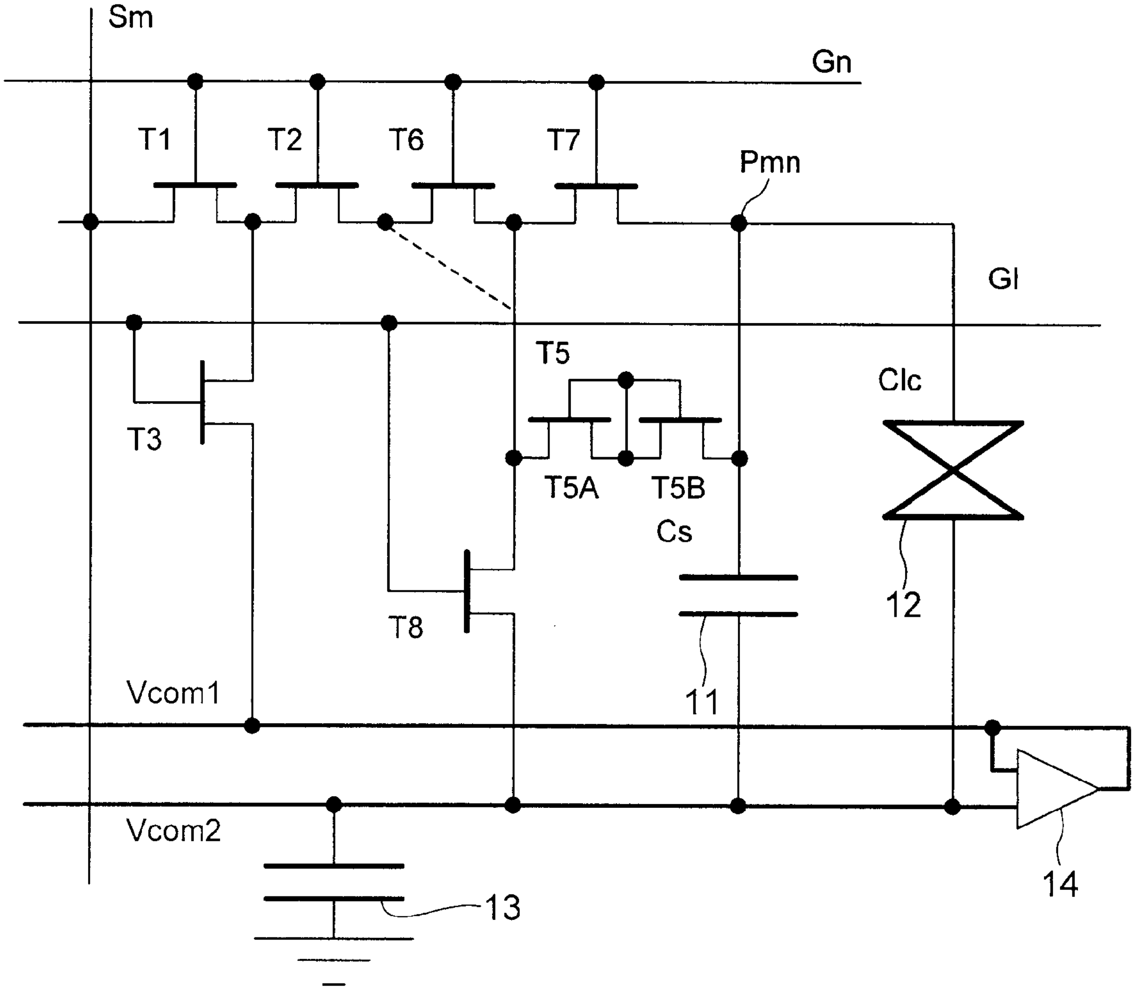
FIG. 7 is a circuit diagram showing one of display cells in a fourth embodiment of the active matrix liquid crystal display device according to the present invention.

FIG. 7 is a circuit diagram showing one of the display cells in a fourth embodiment of the active matrix liquid crystal display device according to the present invention.

This embodiment is a modification based upon the embodiment as shown in FIG. 5. Specifically, though the transistor T5 functions to balance between the leak of the transistor T3 at its right and the leak at its left, transistors T6 and T7 in series are added to the transistors T1 and T2 in series between the source bus and the pixel electrode in order to isolate the transistor T5 from the transistor T3, and a thin film transistor T8, which has its gate connected to the gate line G1, is connected between a node or the midpoint of the transistors T6, T7 and the second common line. In addition, assuming that a node between the midpoint of the transistors T6, T7 and a transistor T8 is Node A, the transistor 5 is connected between Node A and the pixel electrode. An attenuator consisting of the transistors T1 to T3 and the transistors T6 to T8 is also named type attenuator because of the arrangement of its components. The transistors T2 and T6 may be replaced with a single alternative transistor to reduce the number of the components.

The transistor T8 is a substitution for the transistor T4 in the embodiment shown in FIG. 5, and is a transistor to be chosen which is capable of detecting a drain level as the transistors T5 and T4.

Figure 8:
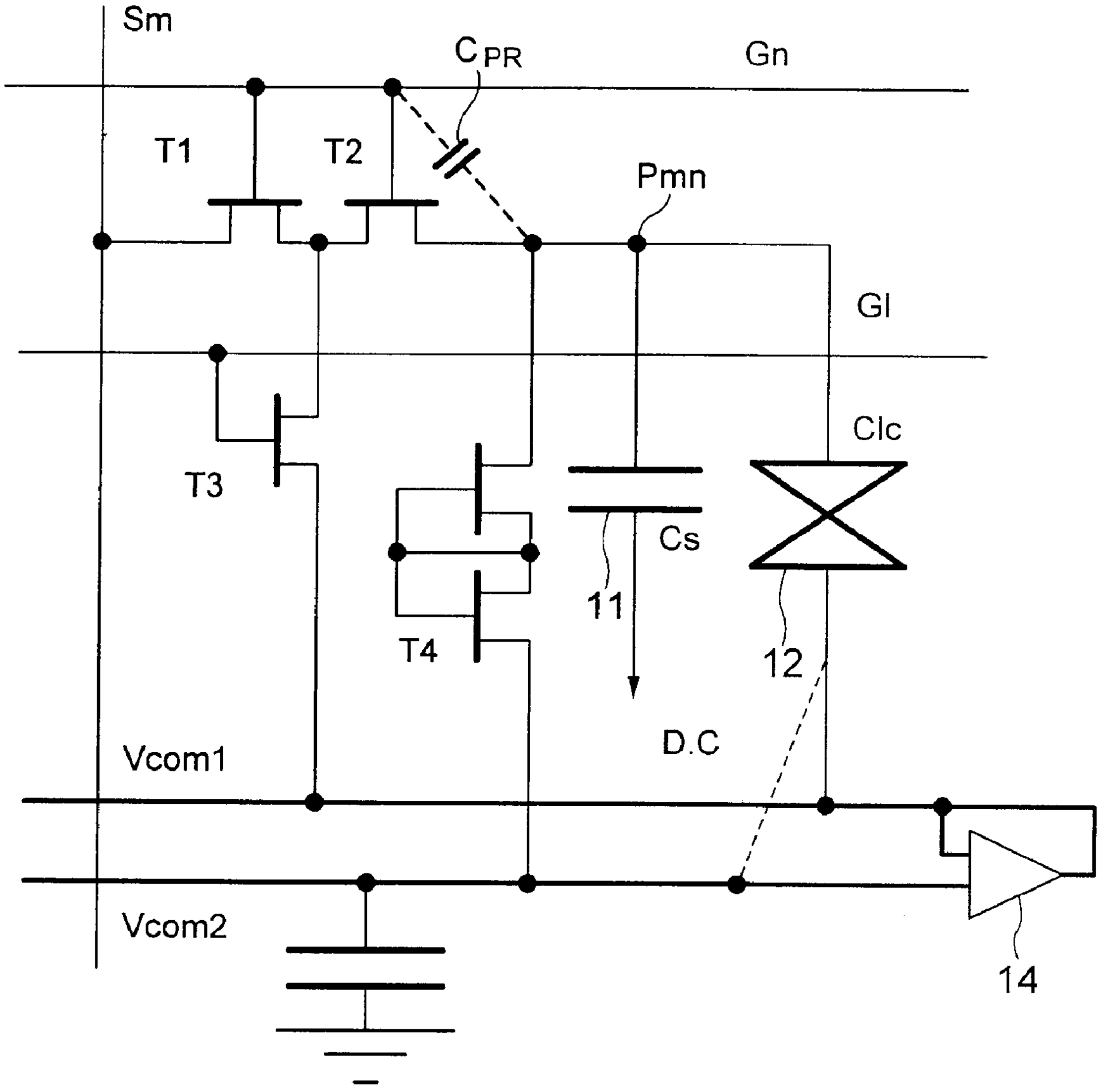
FIG. 8 is a circuit diagram showing one of display cells in a fifth embodiment according to the present invention.

FIG. 8 is a circuit diagram of a modification of the embodiment in FIG. 2, showing one of display cells in a fifth embodiment.

This embodiment is different from the embodiment in FIG. 2 in that the liquid crystal cell 12 is connected between the pixel electrode Pmn and the first common line and that the memory capacity 11 associated with the liquid crystal cell 12 is connected between the pixel electrode Pmn and the DC power supply.

Provided a parasitic capacitance Cpr exists in some relation with the transistor T2 between the gate line Gn and the pixel electrode Pmn, capacity division of the capacitances Cs and Cpr enables the charge storage in the memory capacity (Cs) 11 to be carried out at an arbitrary DC current voltage level.

Figure 9:
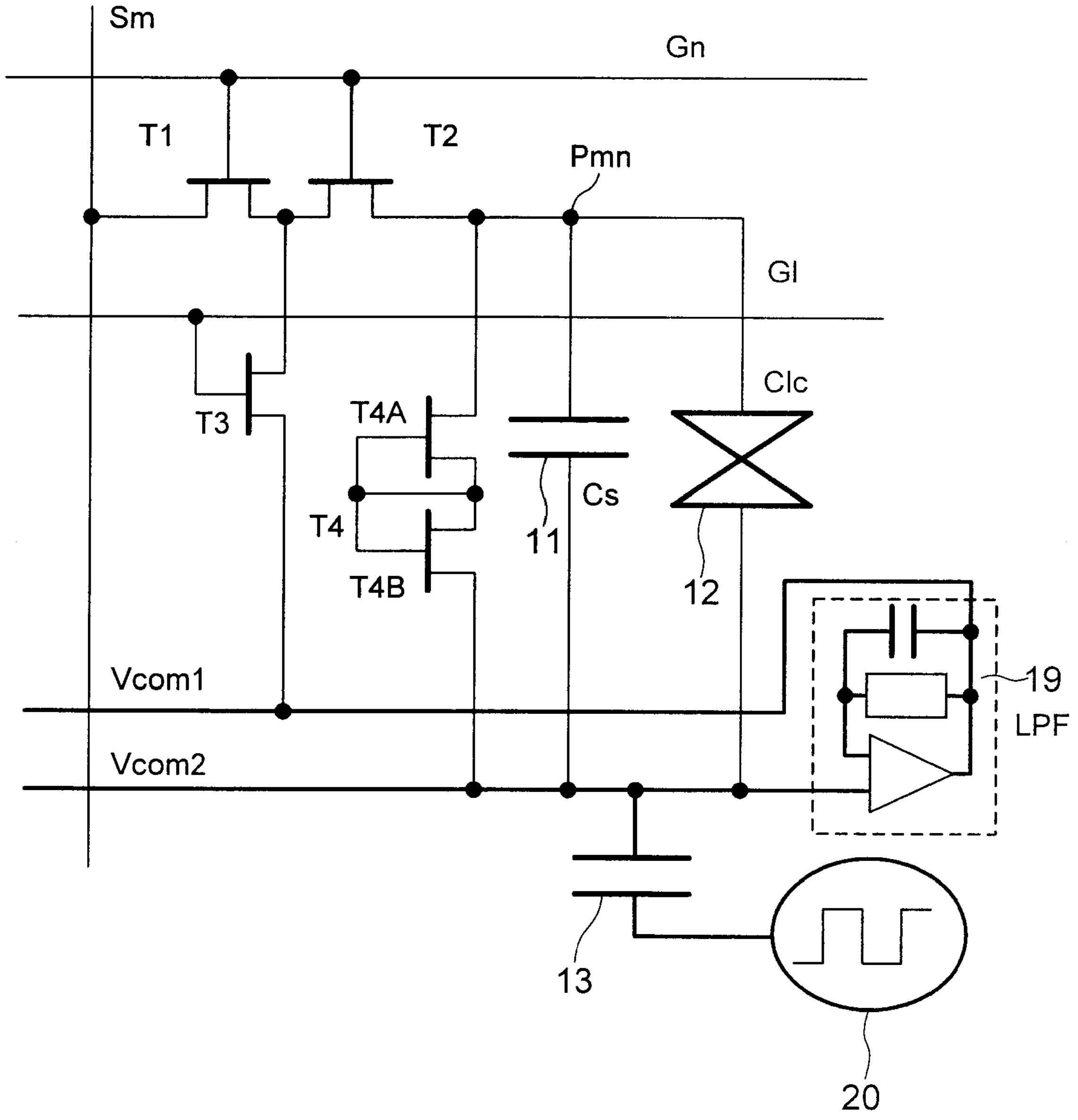
FIG. 9 is a circuit diagram showing one of display cells in a sixth embodiment of the active matrix liquid crystal display device according to the present invention.

Similarly, FIG. 9 is a circuit diagram of a modification of the embodiment in FIG. 2, showing one of display cells in a sixth embodiment according to the present invention. In this embodiment, the buffer amplifier in FIG. 2 is replaced with a low-pass filter (LPF) 19, and an alternating waveform generator 20 which generates waveform periodically inverting itself is connected without grounding the capacitance 13 of a great capacity.

First, the low-pass filter 19 effects an elimination of a common inversion signal from the common level of a low impedance, and therefore, the DC level can be stabilized to enhance a function to let out the leak current in the transistor T3.

The alternating waveform generator 20 generates an inversion waveform to invert the level at the second common line, but the second common line still remains in a floating condition as for the direct current DC, and the circuit operation is similar to that in FIG. 2.

Although the invention of this application has been described in the context of the embodiments, any modification made without departing from the true spirit of the present invention is intended to fall in the scope of the present invention.

LIST OF REFERENCE NUMERALS

10 storage capacitor
12 liquid crystal cell
13 backup capacitance
14 buffer amplifier
17 switch
18 low DC power supply
19 LPF

The invention claimed is:

1. An active matrix liquid crystal display device comprising a plurality of gate lines, a plurality of source busses extending orthogonal to the gate lines, a plurality of liquid crystal elements provided in intersections of the gate lines with the source busses and, as a whole, disposed in matrix form, the liquid crystal elements being connected between a pixel electrode and an opposite electrode connected to a first bus line in a floating condition, a plurality of control circuits provided in relation with the liquid crystal elements, the control circuits having:

first and second transistors, of which gates are connected to the gate lines respectively, arranged in series between the source busses and the pixel electrode, a third transistor provided between a midpoint node of the first and second transistors and a second bus line to serve as a switch, the second bus line being identical in potential to the first bus line and being electrically isolated from the first bus line, and a fourth transistor between a midpoint node of the first and second transistors and the pixel electrode to constitute a high resistance element, and wherein resistance of the third transistor is greater than ON resistance of the first or second transistor, the fourth transistor is greater in resistance than the third transistor, the OFF resistance of the first or second transistor is greater than the resistance of the fourth transistor.

2. An active matrix liquid crystal display device as claimed in claim 1, wherein the second bus line is lower in impedance than the first bus line.

3. An active matrix liquid crystal display device as claimed in claim 1, wherein a capacitance with a great capacity is connected to the first bus line.

4. An active matrix liquid crystal display device comprising a plurality of gate lines, a plurality of source busses extending orthogonal to the gate lines, a plurality of liquid crystal elements provided in intersections of the gate lines with the source busses and, as a whole, disposed in matrix form, the liquid crystal elements being connected between a pixel electrode and an opposite electrode connected to a first bus line in a floating condition, a plurality of control circuits provided in relation with the liquid crystal elements, the control circuits having:

first and second transistors, of which gates are connected to the gate lines respectively, arranged in series between the source busses and the pixel electrode, a third transistor provided between a midpoint node of the first and second transistors and a second bus line to serve as a switch, the second bus line being identical in potential to the first bus line and being electrically isolated from the first bus line, wherein the third transistor constitutes a high resistance element having resistance greater than ON resistances of the first and second transistors, a fourth transistor connected in parallel with the liquid crystal elements between the pixel electrode and the opposite electrode, and a fifth transistor between a midpoint node of the first and second transistors and the pixel electrode to constitute a high resistance element, and wherein resistance of the third transistor is greater than ON resistance of the first or second transistor, the fifth transistor is greater in resistance than the third transistor, the OFF resistance of the first or second transistor is greater than the resistance of the fifth transistor.

5. An active matrix liquid crystal display device as claimed in claim 4, wherein the second bus line has lower impedance than the first bus line.

6. An active matrix liquid crystal display device as claimed in claim 4, wherein a capacitance of a great capacity is connected to the first bus line.

7. An active matrix liquid crystal display device as claimed in claim 4, wherein a potential supply means is connected to the first bus line to supply the first bus line with a predetermined potential.

8. An active matrix liquid crystal display device as claimed in claim 4, wherein the fourth transistor constitutes a high resistance element having resistance greater than ON resistances of the first and second transistors.

9. An active matrix liquid crystal display device as claimed in claim 4, further comprising sixth and seventh transistors connected in series between the second transistor and the pixel electrode, and an eighth transistor connected between a midpoint node of the sixth and seventh transistors and the opposite electrode.

* * * * *